Nov. 13, 1928.
J. H. COOK
VALVE
Filed Sept. 29, 1926
1,691,626
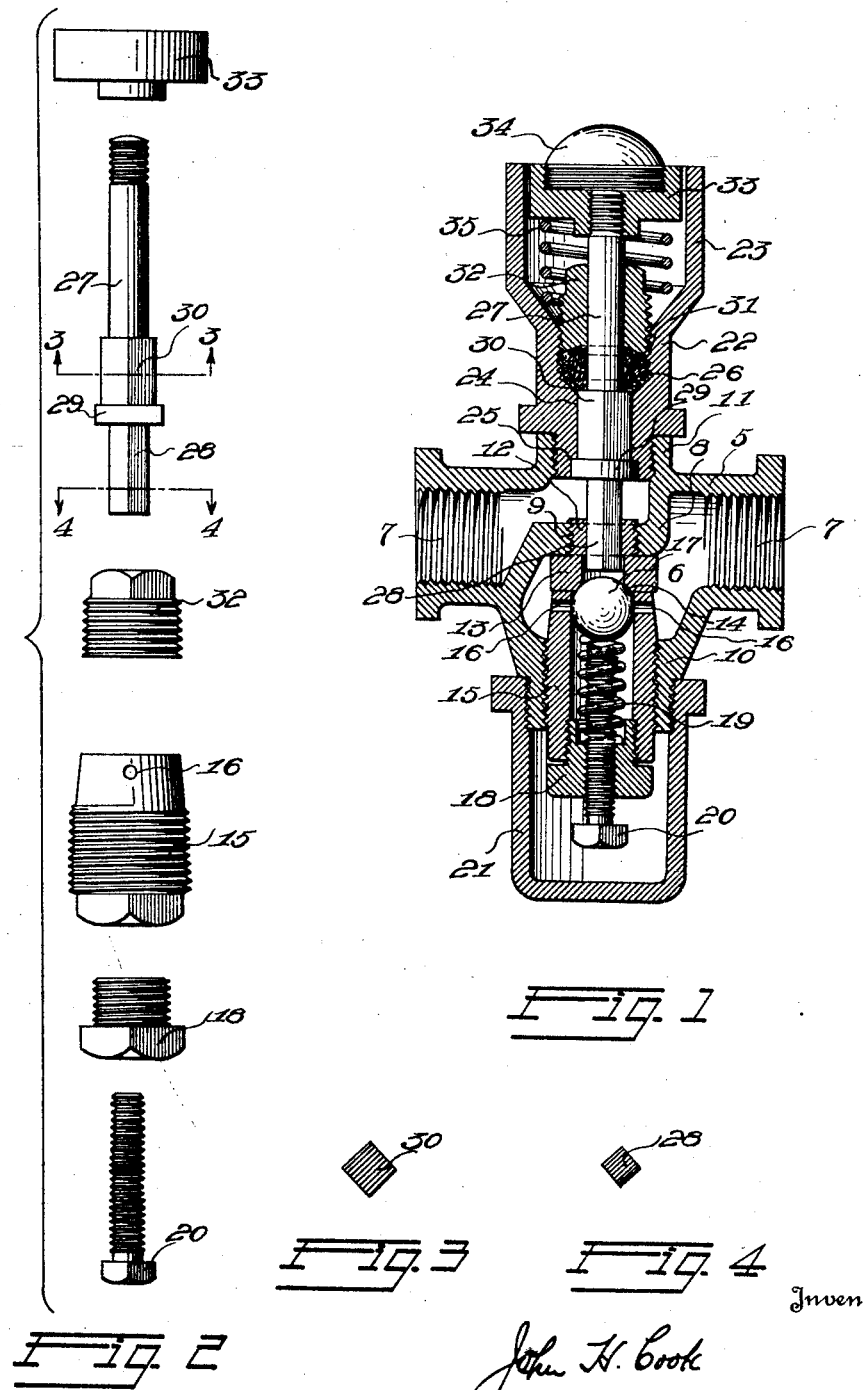

Patented Nov. 13, 1928.

1,691,626

UNITED STATES PATENT OFFICE.

JOHN H. COOK, OF SALT LAKE CITY, UTAH.

VALVE.

Application filed September 29, 1926. Serial No. 138,548.

The present invention relates to valves of the self-closing type and the primary object is to provide a novel and simple structure in which the valve will automatically set itself but may be readily opened, said valve closing as soon as the operator's hand is removed from the actuating mechanism of the valve. A further and important object is to provide a structure in which the parts are readily accessible so that they may be removed or replaced without difficulty.

In the accompanying drawings Figure 1 is a longitudinal sectional view through the valve structure.

Figure 2 is a side elevation of various of the parts in their separated relation.

Figures 3 and 4 are cross sectional views on the line 3—3 and 4—4 of Figure 2.

In the embodiment disclosed a valve casing 5 is provided having a passageway 6 therethrough with opposite openings 7, the walls of which are interiorly threaded for the reception of the threaded ends of pipes and the like. An integral bridge 8 extends across the passageway 6 and has an opening 9 therethrough that is disposed transversely to the main portion of the passageway. This casing furthermore has oppositely outstanding nipples 10 and 11 on opposite sides of the opening 9.

Threaded into the opening 9 is a valve seat element in the form of a boss 12 having a flange 13 abutting the bridge 8 and provided with a tapered valve seat 14. The nipple 10 is interiorly threaded and screwed thereinto is a valve cage 15 that abuts against the flange 13 of the valve seat element 12. This cage is provided with lateral ports 16 that give access to the interior of the cage and thus to the bore of the boss 12. In the cage is located a valve 17 preferably in the form of a ball that cooperates with the seat 14. The outer end of the cage has screwed thereinto a plug 18 and interposed between this plug and the valve 17 is a coiled spring 19 that thus serves to urge the ball valve 17 to the seat 14. The plug is adjustable so that the tension on the spring 19 may be varied. An abutment screw 20 is threaded through the plug 18 and extends into the spring 19 and back of the ball valve 17. It thus determines the amount of movement of said valve away from its seat. The outer ends of the plug 18 and abutment screw 19 as well as the outer end of the valve cage 13 are enclosed by a hood 21 that is threaded onto the exterior of the nipple 10.

A guide member 22 is threaded into the nipple 11 and carries an integral outwardly extending guard sleeve 23. This member has a bore 24 in its inner end that is angular in cross section, the inner terminal of the bore being enlarged to provide a shoulder 25. The bore opens at its outer end into a packing cup 26, the inner portion of which is tapered. A plunger stem 27 is mounted to reciprocate in the guide member 22. The inner end of this plunger stem extends through the valve seat boss 12 to a position to engage the valve 17 when the plunger is moved inwardly. This terminal portion designated 29 is angular in cross section as shown in Figure 4 so as to permit the passage of fluid through the boss around said stem. The stem also has an enlarged collar 29 adapted to abut against the shoulder 25 and thus limit the outward movement of the stem. The portion 30 just above the collar 29 is also angular in cross section and slidably fits the angular portion 24 of the bore so that the stem will not rotate in the member 22. Above this angular portion 30 the stem is reduced in diameter and is preferably cylindrical in cross section, passing through the packing cup 26. In this cup it is surrounded by suitable packing 31 held in place by a plug 32 that is threaded into the cup and surrounds the stem. The outer end of the stem has fixed thereto an actuating head 33 that is located in the guide sleeve 23. This head 33 may be provided with a heat insulating button 34. A coiled spring 35 located in the guard sleeve is interposed between the head 33 and the bottom of said sleeve, serving to urge the head and stem outwardly so that the valve 17 will seat.

With this device it will be evident that fluid entering one of the ports 7 of the casing can be readily controlled. Under normal conditions the valve 17 is closed and thus will hold such fluid against passage through the casing. Upon an inward pressure against the head 33 the plunger stem 27 will be moved inwardly against the valve, thus unseating the valve and permitting the flow of fluid. As soon as this pressure is released the valve will automatically close. With this structure it will be evident that all the parts are readily accessible. The plunger in assembled and mounted condition can be removed from the casing by detaching the guide member 22. The same is also true of the valve, for when the hood 21 is detached the valve cage and the parts carried thereby and located therein can also be removed in assembled condition. The valve seat element is then accessible and if it becomes worn or misshapen it can be substituted by another, properly formed.

From the foregoing, it is thought that the construction, operation, and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

What I claim is:—

1. A valve structure comprising a casing having a bridge and a port through the bridge, a valve cage threaded into the casing and having a valve chamber, a valve in said chamber, a plug for the outer end of the chamber, a spring in the chamber between the valve and the plug, and an abutment for the valve adjustably mounted in the plug.

2. A valve structure comprising a casing having a bridge and a port through the bridge, a valve cage threaded into the casing and having a valve chamber, a valve in said chamber, a plug for the outer end of the chamber, a coiled spring in the chamber between the valve and the plug, and an abutment screw threaded through the plug and having its inner end extending into the spring.

3. A valve structure comprising a casing having a bridge, a valve seat and a nipple, a guide member threaded into the nipple and having an angular bore and an enlarged pocket for packing outside the same, a valve cooperating with the seat, a plunger for operating the valve extending through the guide member and seat, said plunger having an angular portion in the bore and a cylindrical portion in the pocket, packing in the pocket surrounding the cylindrical portion of the plunger, and a plug surrounding the plunger and engaged with the packing.

4. A valve structure comprising a casing having a bridge provided with an opening, and threaded nipples on opposite sides of the opening, a valve seat boss in the opening, a valve cap threaded into one nipple and abutting the boss, a valve in the cage, a spring in the cage bearing against the valve, a stop for the valve carried by the cage, a guide member threaded into the other boss and having an outstanding guard sleeve, a plunger stem extending through the guide member and boss and engaging the valve, packing for the plunger located within the member at the inner end of the sleeve, an actuating head on the plunger within the guard sleeve, and a spring in the guard sleeve behind the head.

5. A valve structure comprising a casing having a bridge and a valve seat carried by the bridge, a valve cage, a valve in the cage cooperating with the seat, a spring in the cage engaging the valve to seat it and having a bearing in the cage, and a stop for the valve adjustably in the cage independently of the spring bearing.

6. A valve structure comprising a casing having a bridge and a nipple at one side of the bridge, a valve in the casing, a guide member mounted in the nipple and including an outstanding guard sleeve provided in its inner end with a reduced packing cup, an actuating stem passing through the guide member and packing cup and operating on the valve, packing in the cup around the stem, a plug threaded into the cup and surrounding the stem, said plug terminating short of the outer end of the guard sleeve, and an operating head on the stem in the guard sleeve and outside the plug.

In testimony whereof, I affix my signature.

JOHN H. COOK.